United States Patent [19]
Gabler, Jr. et al.

[11] 3,857,767
[45] Dec. 31, 1974

[54] RECOVERY OF COPPER FROM CHALCOPYRITE ORE CONCENTRATES

[75] Inventors: Robert C. Gabler, Jr., Grasonville; Earle B. Amey, Greenbelt; Beverly W. Dunning, Jr., Adelphi; Carl E. Goldsmith, Brandywine, all of Md.; Howard W. Leavenworth, Jr., Washington, D.C.

[73] Assignee: The United States of America as represented by the Secretary of the Interior, Washington, D.C.

[22] Filed: June 7, 1974

[21] Appl. No.: 477,229

[52] U.S. Cl. ............................ 204/108, 75/7, 75/9, 75/101 R, 75/114, 75/117, 75/121, 423/140, 423/150
[51] Int. Cl. ......................... C22d 1/16, C22b 1/02
[58] Field of Search .......... 75/101 R, 114, 117, 121, 75/104, 7, 9; 423/140, 150; 204/108

[56] References Cited
UNITED STATES PATENTS

| | | | |
|---|---|---|---|
| 981,451 | 1/1911 | McKechnie et al. | 75/101 R |
| 1,746,313 | 2/1930 | Levy | 75/117 |
| 2,943,929 | 7/1960 | Norman | 423/150 |
| 3,451,804 | 6/1969 | Malmstrom et al. | 75/9 |

*Primary Examiner*—R. L. Andrews
*Attorney, Agent, or Firm*—William S. Brown; Frank A. Lukasik

[57] ABSTRACT

Copper is recovered from chalcopyrite ore concentrates by means of a process comprising (1) partial roasting of the concentrate under conditions producing a calcine consisting essentially of bornite and troilite, (2) acid leaching the calcine to remove iron, and (3) dissolving the copper sulfide residue to form an electrolyte for electrowinning copper.

3 Claims, 1 Drawing Figure

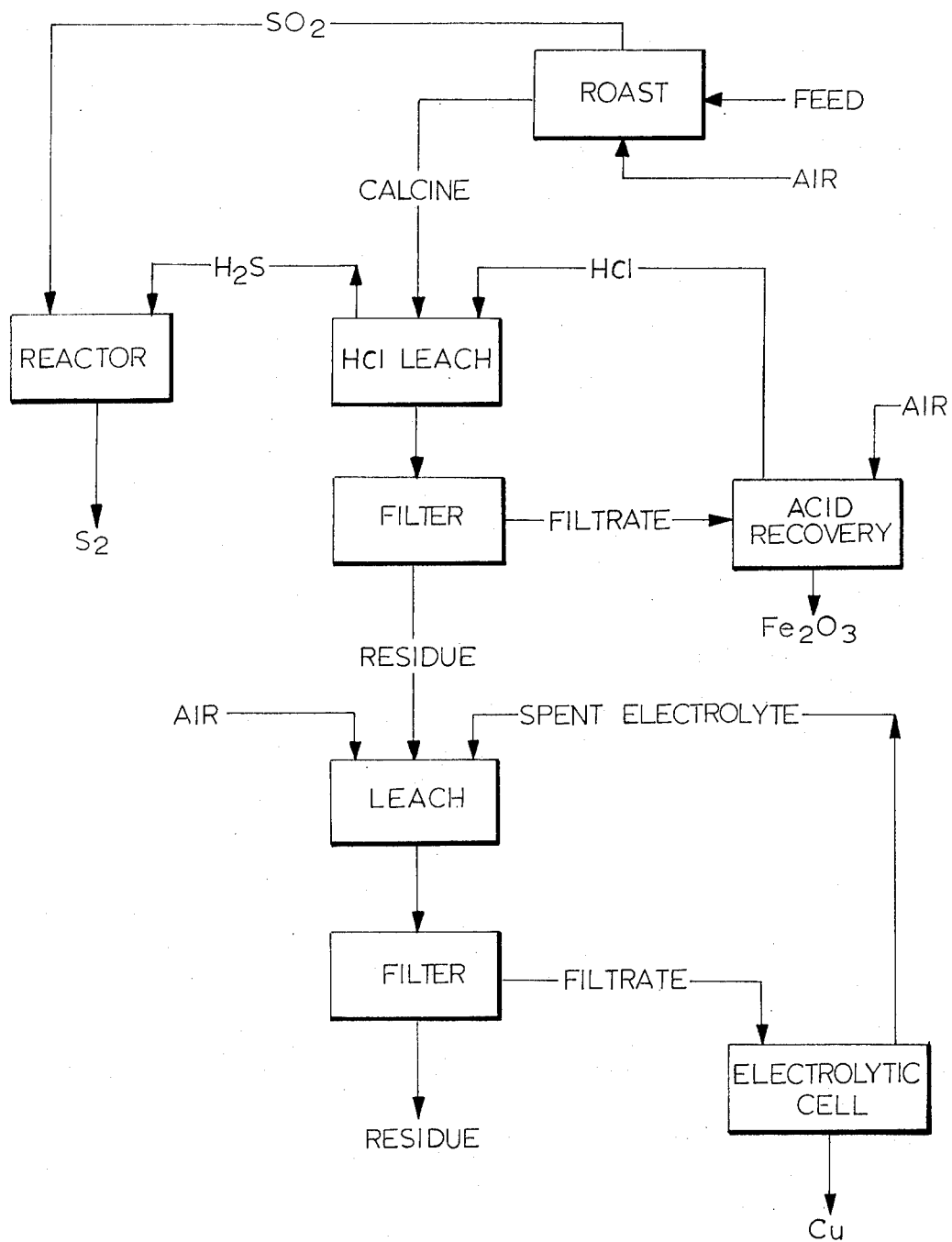

RECOVERY OF COPPER FROM CHALCOPYRITE ORE CONCENTRATES

Copper is conventionally recovered from sulfide ores by means of a complex, multistep process involving the use of a reverberatory furnace and production of blister copper. This process has the disadvantages of requiring the use of large amounts of fuel and results in release of large quantities of $SO_2$ gas, thereby creating air pollution problems.

It has now been found that copper may be recovered from chalcopyrite ore concentrates, without the above disadvantages, by means of a process involving roasting of the concentrate to remove sulfur and to convert the chalcopyrite to a calcine consisting essentially of bornite ($FeS \cdot 2Cu_2S \cdot CuS$) and troilite (FeS), followed by acid leaching to remove iron and dissolution of the residue to provide an electrolyte solution from which the copper can be electrowon. In this process, sulfur is recovered largely as elemental sulfur, and iron as $Fe_2O_3$, the latter being suitable for use as a blast furnace feed in the steel industry. The process thus has the additional advantage that it does not accumulate large quantities of waste materials.

The invention will be more specifically described with reference to the FIGURE, which is a flow diagram of the process of the invention.

The feed material to the process of the invention is a chalcopyrite ore concentrate. Such a concentrate is conventionally prepared by crushing the ore so that 75 to 90 percent passes through 65 to 100 mesh screens, and froth floating the chalcopyrite with reagents such as xanthates. The concentrate generally comprises about 60 to 95 percent chalcopyrite ($CuFeS_2$), with minor amounts of other sulfides and gangue materials.

The concentrate is fed to a roaster where it is roasted at a temperature, and for a time, sufficient to convert the concentrate to the two-phase structure, bornite plus troilite. It has been found that this is most conveniently and efficiently accomplished by roasting the concentrate in a fluidized bed under controlled oxidizing conditions. In this type of roast, the amount of oxygen in the feed, or fluidizing, gas is controlled so that only partial roasting is obtained. This results in removal of about 20 to 25 percent of sulfur in the concentrate, and formation of products consisting mainly of sulfur dioxide, troilite, and bornite.

Excessive oxidation may result in formation of hematite, magnetite, copper oxide, or copper sulfate. Hematite and magnetite reduce the amount of iron that can be leached, and a high build-up of hematite catalyzes conversion of copper compounds to copper sulfate. Copper oxide and copper sulfate are both soluble during leaching and lead to nonrecoverable copper losses. If, on the other hand, insufficient sulfur is removed during roasting, the products will be either β- or γ-chalcopyrite, neither of which can be leached of iron to any significant degree. The undissolved iron again causes trouble during copper leaching and subsequent electrowinning. Thus, a carefully controlled oxidative fluidized bed roast will produce the required phases for iron leaching and minimize copper losses, while producing sufficient sulfur dioxide for reaction with hydrogen sulfide produced during first stage leaching.

The feed gas consists essentially of an inert gas such as nitrogen, containing about 1 to 10 percent of oxygen. It may consist of partially combusted air, i.e., air that has been reacted with a fuel gas such as natural gas in a mixture consisting of about 96 percent air and 4 percent methane. This combustion also serves to provide the heat necessary to obtain the required roasting temperature.

The concentrate is initially reduced by conventional means to a particle size of about 65 to 100 mesh, and is then fluidized by a flow of feed gas at a velocity sufficient for fluidization. This superficial gas velocity will, of course, vary with the amount and particle size of the concentrate, but a velocity of about 3 to 4.5 feet per second is usually satisfactory. Temperature of the fluidized bed is maintained at about 600° to 800°C for a roasting period of about 10 to 60 minutes in order to substantially completely decompose the concentrate, with resulting formation of bornite and troilite. Typically, about 30 minutes at a temperature of about 620°C is satisfactory.

The roasting temperature may be maintained by any conventional means such as partially burning the feed gas, as discussed above, or, preheating of the fluidizing gas may be employed.

Although the fluidized bed roasting is the preferred procedure, vacuum roasting may also be employed, e.g., roasting in a vacuum of about 0.1 to 0.4mm Hg at a temperature of about 800° to 950°C for a period of about 3 to 8 hours will generally also give substantially complete conversion to bornite and troilite. Similar results may also be achieved by fluidized bed roasting in an inert atmosphere, e.g., in an atmosphere of nitrogen, at a temperature of about 600° to 900°C for a period of about one-half to 5 hours.

Calcine from the roasting operation is then leached with hot hydrochloric acid solution to remove iron. Concentration of the acid has been found to be critical and should be about 9.7 to 9.8 weight percent hydrogen chloride for efficient removal of iron. Optimum temperature of the leach solution and time of leaching will vary with the specific concentrate. However, a temperature of about boiling and time of about 8 to 15 minutes are generally suitable. Typically, treatment with a boiling 2.67 N HCl (9.7 percent) solution for about ten minutes may be used. Preferably, the hot calcine from the roasting operation is cooled just sufficiently to heat the leach solution to the boiling point, thus providing the required leach temperature.

During this leach, $H_2S$ is generated in an amount slightly greater than that necessary to convert the $SO_2$ produced in the roasting operation to elemental sulfur according to the equation:

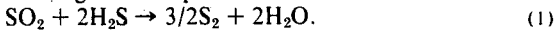

$$SO_2 + 2H_2S \rightarrow 3/2S_2 + 2H_2O. \tag{1}$$

After dissolution of the iron, the leach liquor is quenched by adding about 1 to 2 volumes of water, preferably about 1.5 volumes, to prevent dissolution of copper, and is then filtered.

The iron chloride-rich filtrate is preferably air-oxidized to the ferric state and hydrolyzed to $Fe_2O_3$ to regenerate the acid, as well as forming valuable by-product $Fe_2O_3$. These reactions are represented by the equations:

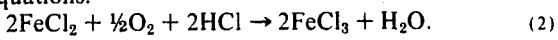

$$2FeCl_2 + \tfrac{1}{2}O_2 + 2HCl \rightarrow 2FeCl_3 + H_2O. \tag{2}$$

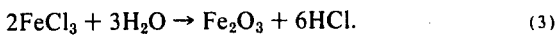

$$2FeCl_3 + 3H_2O \rightarrow Fe_2O_3 + 6HCl. \tag{3}$$

This acid regeneration procedure is disclosed in greater detail in Iron and Steel Engineer, April 1973, pp. 40-42.

The filter residue consists mainly of digenite ($Cu_{1.8}S$) with trace amounts of chalcocite ($Cu_2S$) and covellite (CuS), as well as small amounts of $SiO_2$ and $Al_2O_3$ gangue. This residue is leached in a second leach tank for a period of about 12 to 36 hours at about 85° to 95°C, preferably with continuous agitation, to form an electrolyte solution suitable for electrowinning the copper. Suitable leach solutions for this purpose are well knwon and are described in numerous prior art publications, e.g., in "Electrochemical Engineering" by C. L. Mantell, 1960, Chap. 10. These solutions generally comprise aqueous sulfuric acid of a concentration of about 60 to 80 grams/liter and generally also contain other solubilizing ingredients, e.g., $Fe_2(SO_4)_3$, in a concentration sufficient to facilitate dissolution of copper sulfides.

Applicants have also found that this leach solution may be derived from spent electrolyte from prior copper electrowinning processes. These will generally consist of an aqueous solution of sulfuric acid in an amount of about 65 to 76 grams/liter and $FeSO_4$ in an amount of about 7 to 9 grams/liter. The spent electrolyte is initially treated by bubbling air through the solution in an amount and for a time sufficient to oxidize the $FeSO_4$ to $Fe_2(SO_4)_3$. The ferric sulfate then dissolves the copper sulfides, with formation of additional elemental sulfur, according to the equations:

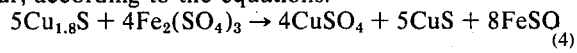
(4)

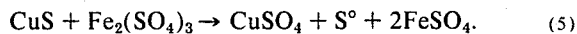
(5)

High purity copper, e.g., 99.9+ percent purity, may then be recovered from the pregnant electrolyte by conventional electrowinning procedures.

The invention will be more specifically illustrated by the following examples:

EXAMPLE 1

A chalcopyrite flotation concentrate assaying 28.4 percent copper, 28.0 percent iron, 31.9 percent sulfur, 0.60 percent zinc, 0.06 percent lead, 0.3 percent molybdenum, 0.43 percent calcium oxide, and 7.0 percent insoluble was employed in this example. In addition, the concentrate assayed 0.003 ounce gold and 3.3 ounces silver per ton. Spectrographic analysis showed the presence of silicon and aluminum in significant amounts and small quantities of titanium, bismuth, manganese, barium, cobalt, lithium, nickel, and strontium.

A sample of the chalcopyrite concentrate was roasted in a fluidized bed at 700°C for one-half hour using a gas mixture of approximately 93 percent nitrogen and 7 percent oxygen producing a calcine that was mainly a bornite-troilite type material. This material was leached with 2.7N HCl at 102°C for ten minutes. Greater than 90 percent of the iron was removed leaving a residue that was mainly digenite with lesser amounts of chalcocite and covellite. Leach tests showed that over 65 percent of the copper was dissolved with spent electrolyte when the residue was leached for six hours at 90°C in a solution that was agitated with bubbled air. Nearly complete extraction of copper could be accomplished in about twelve hours.

EXAMPLE 2

A sample of the chalcopyrite concentrate was vacuum roasted for eight hours at 850°C at 0.1mm Hg. The calcine had a composition of 30 percent Cu, 32 percent Fe, and 26 percent S. The calcine was leached with 2.7N HCl for ten minutes at 102°C. Greater than 99% of the iron was removed and a residue was left that was mainly digenite with lesser amounts of chalcocite and covellite.

We claim:

1. A process for recovery of copper from chalcopyrite ore concentrate comprising (1) partially roasting the concentrate at a temperature and for a time sufficient to produce a calcine consisting essentially of bornite and troilite, (2) leaching the calcine with hydrochloric acid solution having a concentration of about 9.7 to 9.8 weight percent hydrogen chloride to remove iron and (3) dissolving the copper sulfide residue to form an electrolyte suitable for electrowinning copper.

2. The process of claim 1 in which the concentrate is roasted in a fluidized bed, under controlled oxidizing conditions.

3. The process of claim 1 in which the dissolution of copper sulfide residue is accomplished by means of spent electrolyte from a copper electrowinning process.

* * * * *